(12) United States Patent
Lakhani et al.

(10) Patent No.: US 9,940,972 B2
(45) Date of Patent: Apr. 10, 2018

(54) VIDEO TO DATA

(71) Applicant: Cellular South, Inc., Ridgeland, MS (US)

(72) Inventors: Naeem Lakhani, Croyden (GB); Bartlett Wade Smith, IV, Madison, MS (US)

(73) Assignee: Cellular South, Inc., Ridgeland, MS (US)

( * ) Notice: Subject to any disclaimer, the term of this patent is extended or adjusted under 35 U.S.C. 154(b) by 289 days.

(21) Appl. No.: 14/175,741

(22) Filed: Feb. 7, 2014

(65) Prior Publication Data

US 2015/0050010 A1  Feb. 19, 2015

Related U.S. Application Data

(60) Provisional application No. 61/866,175, filed on Aug. 15, 2013.

(51) Int. Cl.
| | |
|---|---|
| *G10L 15/00* | (2013.01) |
| *G10L 25/00* | (2013.01) |
| *G06F 17/30* | (2006.01) |
| *G06T 7/00* | (2017.01) |
| *G11B 27/036* | (2006.01) |
| *G10L 25/57* | (2013.01) |
| *H04N 21/4402* | (2011.01) |
| *G10L 15/26* | (2006.01) |
| *G06K 9/00* | (2006.01) |

(52) U.S. Cl.
CPC ............ *G11B 27/036* (2013.01); *G10L 25/57* (2013.01); *H04N 21/440236* (2013.01); *G06F 17/30* (2013.01); *G06K 9/00456* (2013.01); *G06K 2209/01* (2013.01); *G10L 15/26* (2013.01)

(58) Field of Classification Search
CPC ....... G10L 15/18; G10L 15/26; G10L 15/265; G10L 25/48; G10L 25/51; G10L 25/54; G10L 25/57; G06F 17/30; G06F 17/30058; G06F 17/3074; G06F 17/30781; G06T 7/0081; G06K 9/00456; G06K 2209/01
USPC ..... 704/231, 270, 270.1, 275; 382/100, 173, 382/176, 177; 345/418; 348/61
See application file for complete search history.

(56) References Cited

U.S. PATENT DOCUMENTS

| | | | | |
|---|---|---|---|---|
| 8,019,163 | B2 * | 9/2011 | Momosaki | G06F 17/30743 369/1 |
| 8,682,739 | B1 * | 3/2014 | Feinstein | G06Q 30/06 705/26.1 |
| 2003/0091237 | A1 * | 5/2003 | Cohen-Solal | G06K 9/3266 382/204 |
| 2003/0112261 | A1 * | 6/2003 | Zhang | 345/716 |
| 2003/0112265 | A1 * | 6/2003 | Zhang | 345/723 |
| 2003/0218696 | A1 * | 11/2003 | Bagga | G06F 17/30796 348/700 |
| 2005/0108004 | A1 * | 5/2005 | Otani et al. | 704/205 |

(Continued)

*Primary Examiner* — Paras D Shah
(74) *Attorney, Agent, or Firm* — Steptoe & Johnson LLP

(57) ABSTRACT

A method and system can generate video content from a video. The method and system can include generating audio files and image files from the video, distributing the audio files and the image files across a plurality of processors and processing the audio files and the image files in parallel. The audio files associated with the video to text and the image files associated with the video to video content can be converted. The text and the video content can be cross-referenced with the video.

20 Claims, 5 Drawing Sheets

(56) References Cited

U.S. PATENT DOCUMENTS

| | | | |
|---|---|---|---|
| 2006/0179453 A1* | 8/2006 | Kadie et al. .................... | 725/34 |
| 2006/0212897 A1* | 9/2006 | Li et al. ......................... | 725/32 |
| 2007/0112630 A1* | 5/2007 | Lau et al. ...................... | 705/14 |
| 2008/0120646 A1* | 5/2008 | Stern et al. .................... | 725/34 |
| 2008/0276266 A1* | 11/2008 | Huchital et al. ............... | 725/32 |
| 2009/0006191 A1* | 1/2009 | Arankalle et al. ............. | 705/14 |
| 2009/0006375 A1* | 1/2009 | Lax et al. ........................ | 707/5 |
| 2009/0199235 A1* | 8/2009 | Surendran et al. ............. | 725/34 |
| 2011/0292992 A1* | 12/2011 | Sirivara ................... | 375/240.01 |
| 2012/0042052 A1* | 2/2012 | Ma ........................... | G06T 1/00 709/219 |
| 2012/0254917 A1* | 10/2012 | Burkitt et al. ................... | 725/40 |
| 2013/0346144 A1* | 12/2013 | Ferren ................. | G06K 9/3266 705/7.29 |
| 2014/0314391 A1* | 10/2014 | Kim ....................... | G11B 27/11 386/248 |
| 2015/0019206 A1* | 1/2015 | Wilder .............. | G06K 9/00302 704/9 |

\* cited by examiner

VIDEO TO DATA

CLAIM OF PRIORITY

This application claims priority to U.S. Provisional Patent Application No. 61/866,175, filed on Aug. 15, 2013, which is incorporated by reference in its entirety.

TECHNICAL FIELD

The present invention relates to a method and a system for generating various and useful data from videos.

BACKGROUND

In the field of image contextualization, distributed reverse image similarity searching can be used to identify images similar to a target image. Reverse image searching can find exactly matching images as well as flipped, cropped, and altered versions of the target image. Distributed reverse image similarity searching can be used to identify symbolic similarity within images. Audio-to-text algorithms can be used to transcribe text from audio. An exemplary application is note-taking software. Audio-to-text, however, lacks semantic and contextual language understanding.

SUMMARY

The present invention is generally directed to a method to generate data from video content, such as text and/or image-related information. A server executing the method can be directed by a program stored on a non-transitory computer-readable medium. The video text can be, for example, a context description of the video.

An aspect of the method can include generating text from an image of the video, converting audio associated with the video to text, extracting topics from the text converted from the audio, cross-referencing the text generated from the image of the video and the topics extracted from audio associated with the video, and generating video text based on a result of the cross-referencing.

In some embodiments, natural language processing can be applied to the generation of text from an image of the video, converting audio associated with the video to text, or both.

In other embodiments, the text from the image of the video can be generated by identifying context, a symbol, a brand, a feature, an object, and/or a topic in the image of the video.

In yet other embodiments, the text from the image can be generated by first segmenting images of the video, and then converting the segments of images to text in parallel. The text from the audio can be generated by first segmenting images of the audio, and then converting the segments of images to text in parallel. The audio can be segmented at spectrum thresholds.

In some embodiments, the method can include generating advertising based on video content. The video content can be text, context, symbols, brands, features, objects, and/or topics related to or found in the video. An advertisement can be placed at a specific time in the video based on the video content and/or section symbol of a video image. In some embodiments, the method can include directing when one or more advertisements can be placed in a predetermined context at a preferred time.

DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF EXEMPLARY EMBODIMENTS

Figure 1:
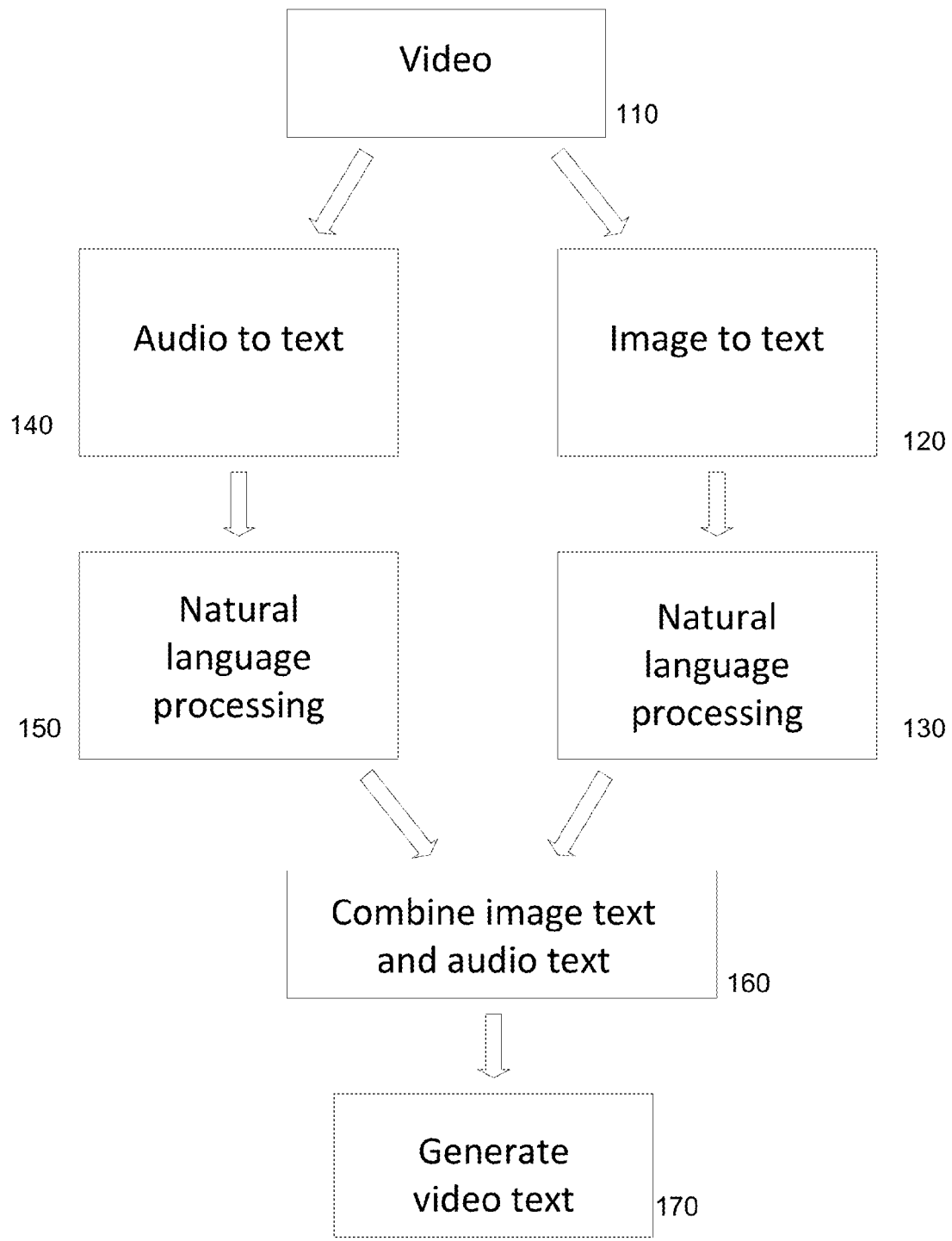
FIG. 1 illustrates an embodiment of present invention.

A detailed explanation of the system and method according to exemplary embodiments of the present invention are described below. Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

The present invention is generally directed to system, device, and method of generating content from video files, such as text and information relating to context, symbols, brands, features, objects, faces and/or topics found in the images of such videos. In an embodiment, the video-to-content engine can perform the functions directed by programs stored in a computer-readable medium. That is, the embodiments may take the form of a hardware embodiment (including circuits), a software embodiment, or an embodiment combining software and hardware. The present invention can take the form of a computer-program product that includes computer-useable instructions embodied on one or more computer-readable media.

The various video-to-content techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

A video-to-content engine can be embodied by the a general-purpose computer or a server and can have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, application programs can be externally stored in or performed by one or more device(s) external to the general-purpose computer.

The general-purpose computer or server may include a central processing unit (CPU) for executing instructions in response to commands, and a communication device for sending and receiving data. One example of the communication device can be a modem. Other examples include a transceiver, a communication card, a satellite dish, an antenna, a network adapter, or some other mechanism capable of transmitting and receiving data over a communications link through a wired or wireless data pathway.

The general-purpose computer or server may also include an input/output interface that enables wired or wireless connection to various peripheral devices. In one implementation, a processor-based system of the general-purpose computer can include a main memory, preferably random access memory (RAM), and can also include a secondary memory, which may be a tangible computer-readable medium. The tangible computer-readable medium memory can include, for example, a hard disk drive or a removable storage drive, a flash based storage system or solid-state drive, a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the tangible computer-readable medium memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or flash memory) and associated socket, and other removable storage units and interfaces, which allow software and data to be transferred from the removable storage unit to the computer system.

An embodiment of video-to-text engine operation is illustrated in FIG. 1. At 110, a video stream is presented. The video stream may be in format of (but not limited to): Advanced Video Codec High Definition (AVCHD), Audio Video Interlaced (AVI), Flash Video Format (FLU), Motion Picture Experts Group (MPEG), Windows Media Video (WMV), or Apple QuickTime (MOV), h.264 (MP4).

The engine can extract audio data and image data (e.g. images or frames forming the video) from the video stream.

In some embodiments, the video stream and the extracted image data can be stored in a memory or storage device such as those discussed above. A copy of the extracted image data can be used for processing.

Figure 2:
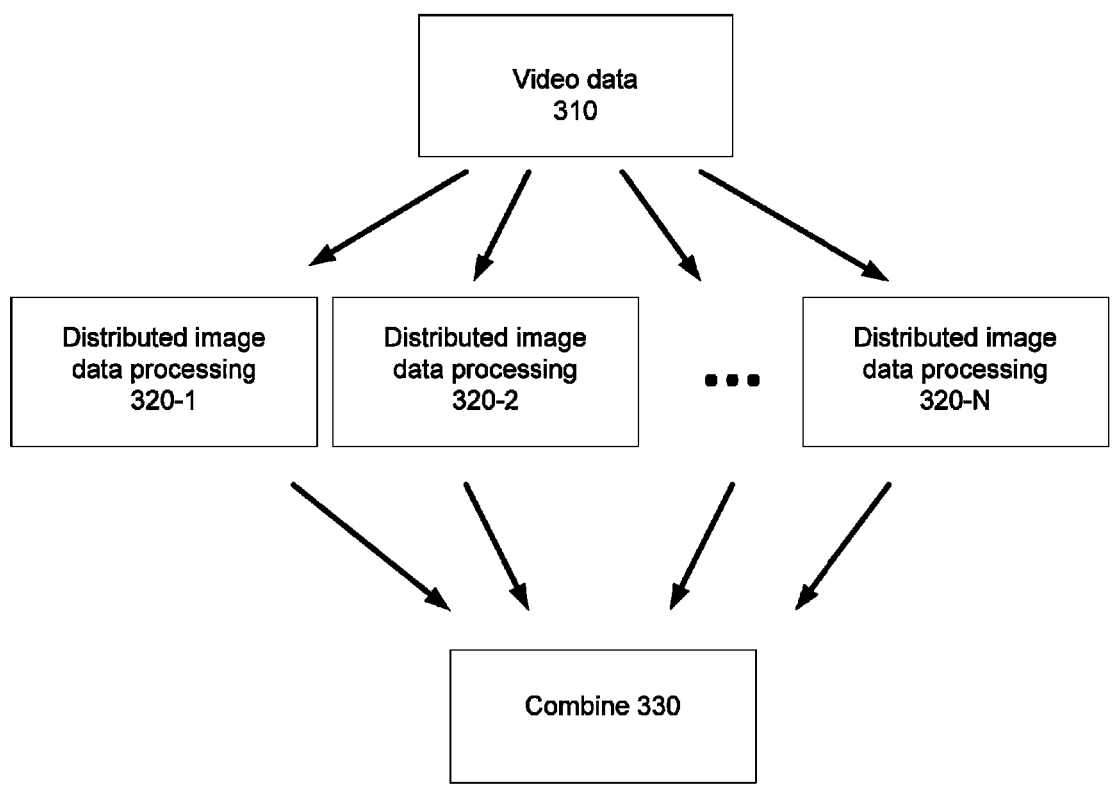
FIG. 2 illustrates an embodiment of image data processing.

At 120, the video-to-text engine performs an image data processing on the video stream. An example of the image data processing is illustrated in FIG. 2. In FIG. 2, the image data 310 can be segmented into N segments and processed in parallel (e.g., distributed processing 320-1 to 320-N), allowing for near real-time processing.

An example of the video image data processing can be symbol (or object) based. Using image processing technique such as color edge detection, a symbol of a screen or an image of the video can be isolated. The symbol can be identified using an object template database. For example, the symbol includes 4 legs and a tail, and when matched with the object template database, the symbol may be identified as a dog. The object template database can be adaptive and therefore, the performance would improve with usage.

Other image data processing techniques may include image extraction, high-level vision and symbol detection, figure-ground separation, depth and motion perception.

Another example of video image processing can be color segmentation. The colors of an image (e.g., a screen) of the video can be segmented or grouped. The result can be compared to a database using color similarity matching.

Based on the identified symbol, a plurality of instances of the symbol can be compared to a topic database to identify a topic (such as an event). For example, the result may identify the dog (symbol) as running or jumping. The topic database can be adaptive to improve its performance with usage.

Thus, using the processing example above, text describing a symbol of the video and topic relating to the symbol may be generated. Data generated from an image and/or from audio transcription can be time stamped, for example, according to when it appeared, was heard, and/or according to the video frame from which it was pulled.

At 330, the engine combines the topics as an array of keys and values with respect to the segments. The engine can segment the topics over a period of time and weight the strength of each topic. Further, the engine applies the topical meta-data to the original full video. The image topics can be stored as topics for the entire video or each image segment. The topic generation process can be repeated for all identifiable symbols in a video in a distributed process. The outcome would be several topical descriptors of the content within a video. An example of the aggregate information that would be derived using the above example would be understanding that the video presented a dog, which was jumping, on the beach, with people, by a resort.

Natural language processing can be useful in creating an intuitive and/or user-friendly computer-human interaction. In some embodiments, the system can select semantics or topics, following certain rules, from a plurality of possible semantics or topics, can give them weight based on strength of context, and/or can do this a distributed environment. The natural language processing can be augmented and/or improved by implementing machine-learning. A large training set of data can be obtained from proprietary or publicly available resources. For example, CBS News maintains a database of segments and episodes of "60-Minutes" with full transcripts, which can be useful for building a training set and for unattended verification of audio segmentation. The machine learning can include ensemble learning based on the concatenation of several classifiers, i.e. cascade classifiers.

At 130, an optional step of natural language processing can be applied to the image text. For example, based on dictionary, grammar, and a knowledge database, the text extracted from video images can be modified as the video-to-text engine selects primary semantics from a plurality of possible semantics. In some embodiments, the system and method can incorporate a Fourier transform of the audio signal. Such filtering can improve silence recognition, which can be useful for determining proper placement of commas and periods in the text file.

In parallel, at 140, the video-to-text engine can perform audio-to-text processing on audio data associated with the video. For example, for a movie video, the associated audio may be the dialog or even background music.

Figure 3:
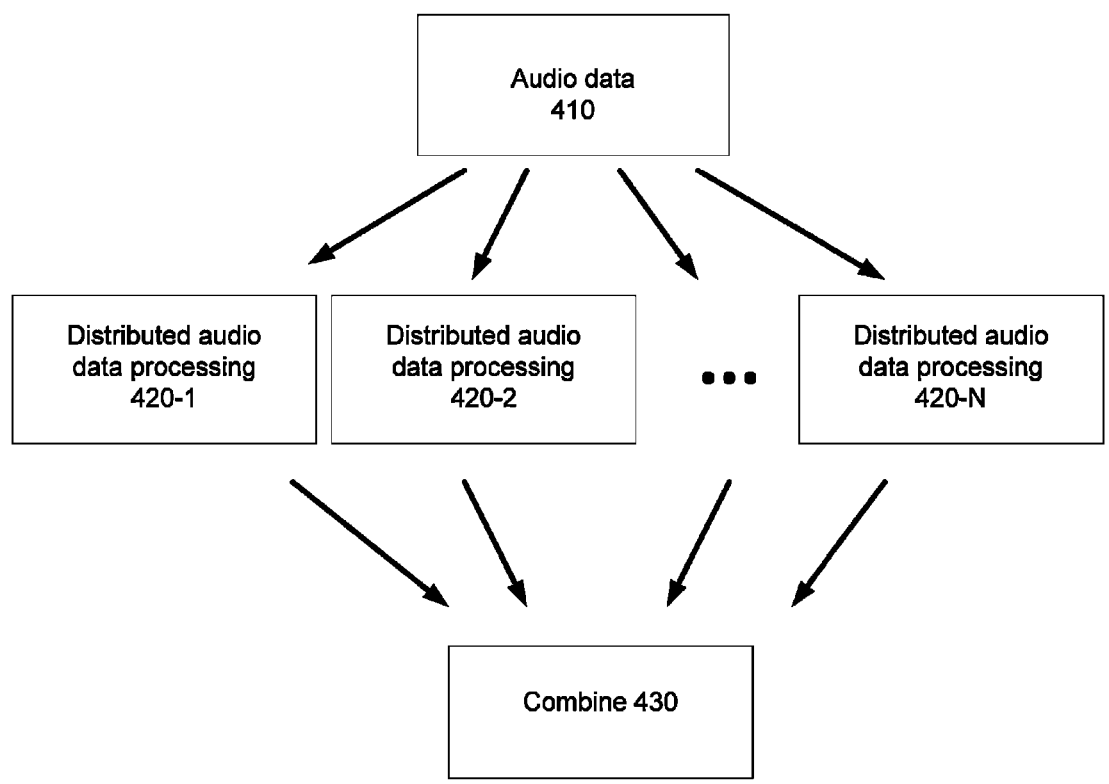
FIG. 3 illustrates an embodiment of audio data processing.

An example of the audio data processing is illustrated in FIG. 3. In FIG. 3, the audio data 410 can be segmented into N segments and processed in parallel (e.g., distributed processing 420-1 to 420-N), allowing for near real-time processing.

In some embodiments, the segmentation can be performed by a fixed period of time. In another example, quiet periods in the audio data can be detected, and the segmentation can be defined by the quiet periods. For example, the audio data can be processed and converted into a spectrum. Locations where the spectrum volatility is below a threshold can be detected and segmented. Such locations can represent silence or low audio activities in the audio data. The quiet periods in the audio data can be ignored, and the processing requirements thereof can be reduced.

Audio data and/or segments of audio data can be stored in, for example, memory or storage device discussed above. Copies of the audio segments can be sent to audio processing.

The audio data for each segment can be translated into text in parallel, for example through distributed computing, which can reduce processing time. Various audio analysis tools and processes can be used, such as audio feature detection and extraction, audio indexing, hashing and searching, semantic analysis, and synthesis.

At 430, text for a plurality of segments can then be combined. The combination can result in segmented transcripts and/or a full transcripts of the audio data. In an embodiment, the topics in each segment can be extracted. When combined, the topics in each segment can be given a different weight.

The audio topics can be stored as topics for the entire video or each audio segment.

At 150, an optional step of natural language processing can be applied to the text. For example, based on dictionary, grammar, and/or a knowledge database, the text extract from the audio stream of a video can be given context, an applied sentiment, and topical weightings.

At 160, the topics generated from an image or a frame and the topics extracted from audio can be combined. The text can be cross-referenced, and topics common to both texts would be given additional weights. At 170, the video-to-text engine generates video text, such as text describing the content of the video, using the result of the combined texts and cross reference. For example, key words indicating topic and semantic that appear in both texts can be selected or emphasized.

Figure 4:
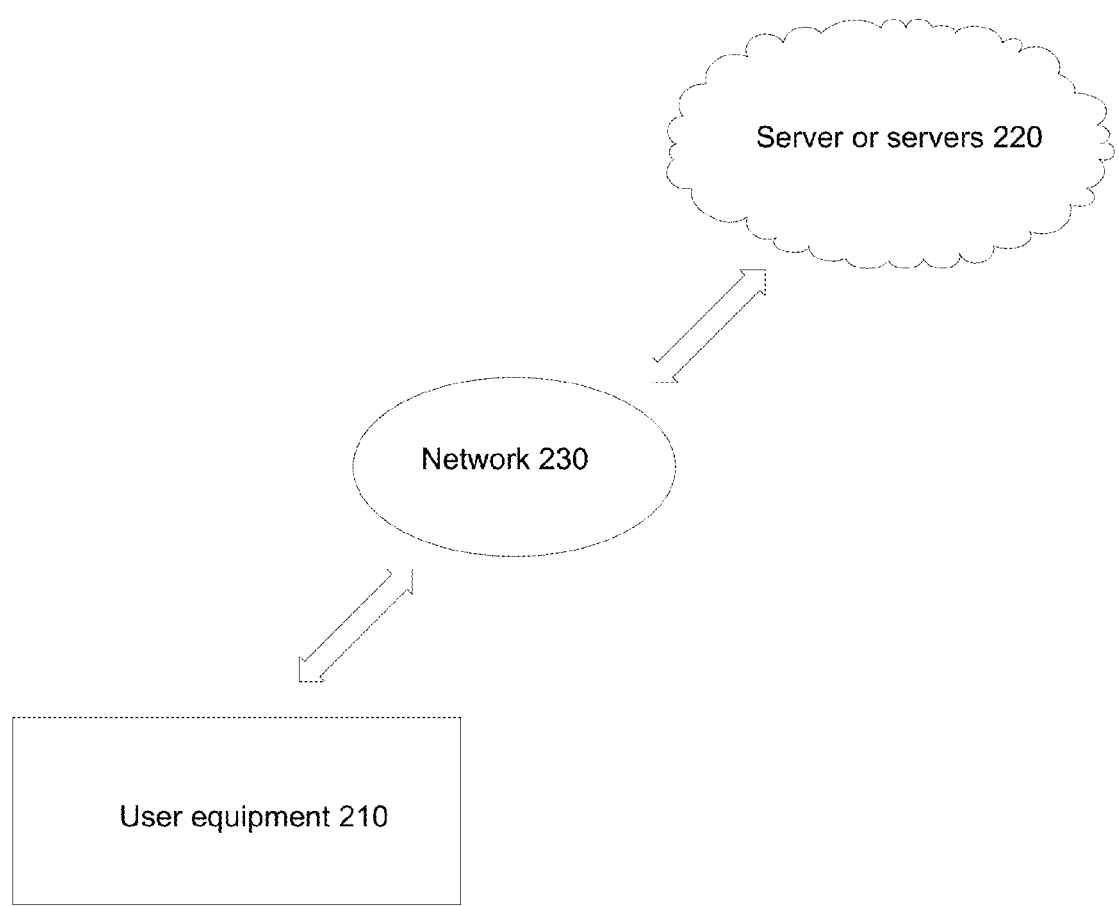
FIG. 4 illustrates another embodiment of present invention.

FIG. 4 illustrates another embodiment of the present invention. User equipment (UE) 210 can communicate with a server or servers 220 via a network 230. An exemplary embodiment of the system can be implemented over a cloud computing network.

The UE 210 can include, for example, a laptop, a tablet, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems.

The server 220 includes the general purpose computer discussed above.

The network 230 includes, for example, the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In some embodiments, a video-to-content engine can be embodied in a server or servers 220. The UE 210, for example, requests an application relating to the video stream. The servers 220 perform the audio-to-text process on the segmented audio in parallel. The distributed audio-to-text processing reduces the overall response time. This method allows real-time audio-to-text conversion.

The UE 210 communicates with the server 220 via the network 230 for video stream application. The video-to-content engine can generate the video text as illustrated in FIG. 1. The server 220 then generates advertisement (text, images, or animation) based on the video text. In some embodiments, the server adds the advertisement to a specific symbol, image, frame, or a specific time in the video stream. The specific symbol, image, frame, or the specific time in the video stream can be selected based on the video text.

The server 220 can add the audio text to the video stream in real time (i.e. real time close caption).

The server 220 can generate video recommendation based on a database of the video text. In some embodiments, the server 220 can search videos based on the video text (e.g., via a database of video text). In this fashion, video search can be optimized. Applications for the video search optimization may include search engine optimization (SEO), search engine marketing (SEM), censorship and removal materials of copyright violation.

The video streams can be videos viewed by a user, and the server 220 generates a preference profile for the user using the video data.

Figure 5:
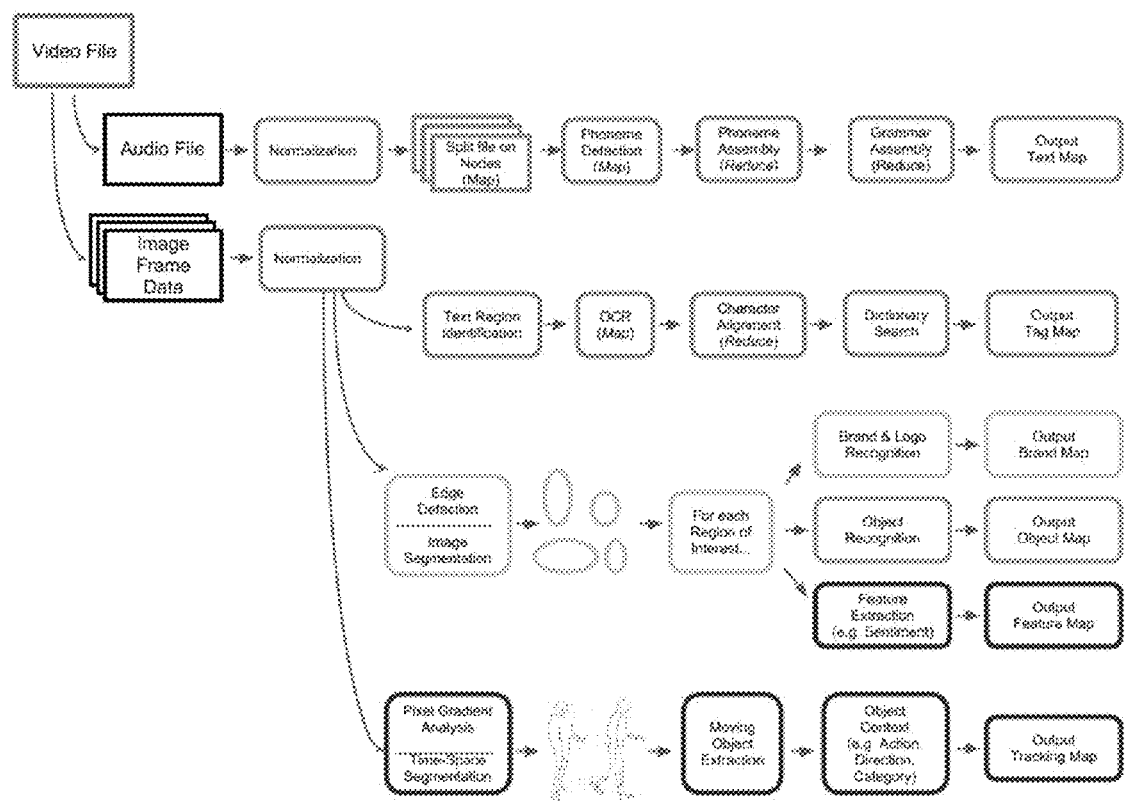
FIG. 5 illustrates various exemplary embodiments of present invention.

In an embodiment, as shown in FIG. 5 for example, a server node can fetch a video file. For example, a URL can be used to fetch the video file from an Internet such as YouTube, and from such URL the video can be scraped. The server can divide the video into chunks of smaller data files for processing on several nodes of a cluster in parallel. For example, the video file can be separated into audio files and image frame files. Each of the types of files can be normalized.

The normalized audio files can be split into constituent files for processing and reduction in parallel by various nodes. Various reduction processes can be performed on the constituent audio files such as phoneme detection and assembly as well as grammar assembly. An output of the audio processing steps can be an extracted text map.

The normalized image frame files can be processed in order to extract various data maps, such as a text map, a tag map, a brand, an object map, a feature map, and/or a tracking map. Such maps can be achieved through various extraction steps. For example, the normalized image frame files can be analyzed for text identification and/or by optical character recognition. The data can be improved through a dictionary verification step. Various maps can be created based on edge detection and/or image segmentation techniques. Such techniques can be improved by focusing on regions of interest, for example based on brands, logos, objects, and/or features of interest. Additionally, or alternatively, pixel gradients of the normalized image frame files can be analyzed and/or the files can be segmented by temporal and/or spatial components, and thus, for example, allow extraction of motion within the video images, which in turn can be used for tracking.

An advantage of present embodiments includes the ability to provide real-time or faster-than-real-time content output. This can be achieved through one or more components and/or steps. For example, a video file can be distributed across at least two layers for processing. The audio can be converted to text on at least one layer, and the images can be processed on at least one other layer. In some embodiments, natural language processing can abstract topics, sentiments, temporal topic-tagging, and can be used for further optimization and/or machine learning. The layers can include node clusters for parallel processing chunks of the video file into the preferred content. In some embodiments, the files can be maintained and processed in parallel at each step, and then combined into a single data file as one of the terminal processing steps.

Present embodiments have wide application. For example, video indexing, reverse image lookup, video co-groupings and graph searches, and video similarity indexing, as described herein, can be used for searching, for classification, and for recommendations regarding processed videos. Law enforcement and security industries can implement embodiments for object recognition and motion detection. Media, entertainment, and industrial entities can implement embodiments to monitor for trademark infringement, captioning, advertising and targeting, brand and product monitoring and data collection, and marketing analytics. These exemplary implementation are not intended to be limiting, merely exemplary.

Additionally, or alternatively, to actively fetching and scraping a video, the system and method can be automated as a push system and/or a web crawling system. For example, the server can monitor an RSS feed or online content of specific providers, such as YouTube, Vimeo, the growing myriad of video-content creating websites, or other online video providers. Monitoring of published videos can be tailored to search for extracted data relevant to specific requesters. For example, a purveyor of certain products can be apprised in real-time of new content relevant to the products. Such relevant content can include the context in which the products are found in the video, the appearance of competing products, verification of product placement, and other useful information.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope or the invention. In addition, from the foregoing it will be seen that this invention is one well adapted to attain all the ends and objects set forth above, together with other advantages. It will be understood that certain features and sub-combinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

The invention claimed is:

1. A method to generate video data from a video comprising:
   generating audio files and image files from the video;
      distributing the image files across a plurality of processors and processing the image files in parallel, wherein processing the image files comprises extracting one or more objects and identifying the one or more objects;
      processing the audio files;
      converting audio files associated with the video to text;
      converting the image files associated with the video to video data;
      generating a topical meta-data that describes content of the video by deriving semantic information from the identification of the one or more objects and semantic information from the audio files;
      adding the topical meta-data to the video; and
      cross-referencing the text and the video data based on the generated topical meta-data to determine topics;
      generating video text based on the cross-referencing, wherein the video text describes content of the video;
      generating a text, image, or animation based on the video text; and
      placing the text, image, or animation in the video.

2. The method according to claim 1, further comprising: generating a content-rich video based on the video, the text, and the video data.

3. The method according to claim 1, further comprising: applying natural language processing to the text to determine context associated with the video.

4. The method according to claim 2, further comprising: applying natural language processing to the text to extract the topical meta-data.

5. The method according to claim 1, further comprising: processing the image files to extract additional text.

6. The method according to claim 5, wherein the additional text is generated by segmenting the image files before processing the image files in parallel.

7. The method according to claim 1, further comprising: determining a motion associated with the one or more objects.

8. The method according to claim 1, further comprising segmenting the audio files before processing the audio files in parallel.

9. The method according to claim 7, wherein the audio files and the image files are segmented at spectrum thresholds.

10. The method according to claim 1, further comprising: generating an advertisement based on the text and the video data.

11. The method according to claim 10, further comprising:
    placing the advertisement in the video at a preferred time.

12. The method according to claim 6 wherein the additional text includes information regarding context associated with the video.

13. The method according to claim 6, wherein the additional text relates to a symbol appearing in the video.

14. The method according to claim 13, wherein the symbol is a brand logo, and wherein the additional text includes information regarding placement and time of appearance of the brand logo.

15. The method according to claim 1, wherein the one or more objects are letters appearing in the video.

16. The method according to claim 6, wherein the additional text relates to faces appearing in the video.

17. A system for extracting data from a video, comprising:
a computer processor having a plurality of processors for parallel processing; and
a non-transitory computer readable medium containing instructions directing the system to execute the steps of:
converting audio associated with the video to text;
converting images associated with the video to video data;
generating the video data by segmenting image files of the video before processing the image files in parallel;
identifying one or more objects in the image files;
generating data topics, from the text and the video data, that describe content of the video by deriving semantic information from the identification of the one or more objects and semantic information from the audio;
adding the data topics to the video as meta-data;
cross-referencing the text, the video data, and the topics with the video based on the generated data topics;
generating a text, image, or animation based on the data topics; and
placing the text, image, or animation in the video.

18. The system according to claim 17, wherein converting the audio comprises natural language processing.

19. The system according to claim 17, the computer directs the audio to be converted by at least one node of a cluster and the computer directs the images to be converted by at least one other node of the cluster in parallel.

20. The server according to claim 17, wherein the audio and the images are segmented at spectrum thresholds.

* * * * *